(12) United States Patent
Watanabe et al.

(10) Patent No.: US 7,843,499 B2
(45) Date of Patent: Nov. 30, 2010

(54) IMAGE CAPTURING SYSTEM EMPLOYING DIFFERENT ANGLE CAMERAS ON A COMMON ROTATION AXIS AND METHOD FOR SAME

(75) Inventors: Keisuke Watanabe, Mizuho (JP); Tatsushi Ohyama, Ogaki (JP); Keishi Kato, Komaki (JP); Kuniyuki Tani, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 387 days.

(21) Appl. No.: 11/680,151

(22) Filed: Feb. 28, 2007

(65) Prior Publication Data

US 2007/0200933 A1    Aug. 30, 2007

(30) Foreign Application Priority Data

Feb. 28, 2006  (JP)  ............................. 2006-052885
Jun. 30, 2006  (JP)  ............................. 2006-181200

(51) Int. Cl.
H04N 9/64  (2006.01)

(52) U.S. Cl. ............... 348/242; 348/143; 348/211.11; 348/218.1

(58) Field of Classification Search ........... 348/242, 348/143
See application file for complete search history.

(56) References Cited

U.S. PATENT DOCUMENTS

| | | | | |
|---|---|---|---|---|
| 5,054,725 A * | 10/1991 | Bucefari et al. | ....... | 248/123.11 |
| 6,215,519 B1 * | 4/2001 | Nayar et al. | .............. | 348/159 |
| 6,301,447 B1 * | 10/2001 | Jackson et al. | ............. | 396/329 |
| 6,977,676 B1 * | 12/2005 | Sato et al. | .............. | 348/211.11 |
| 7,071,971 B2 * | 7/2006 | Elberbaum | ............. | 348/211.11 |
| 7,129,971 B2 * | 10/2006 | McCutchen | .................. | 348/37 |
| 7,629,995 B2 * | 12/2009 | Salivar et al. | ............... | 348/143 |
| 7,719,568 B2 * | 5/2010 | Hung et al. | ................. | 348/159 |
| 2002/0152557 A1 * | 10/2002 | Elberbaum | ..................... | 8/405 |
| 2005/0069195 A1 * | 3/2005 | Uezono et al. | ............. | 382/154 |
| 2005/0104999 A1 * | 5/2005 | Wada et al. | ................. | 348/373 |
| 2006/0209186 A1 * | 9/2006 | Iyoda et al. | ................. | 348/142 |
| 2007/0268369 A1 * | 11/2007 | Amano et al. | .......... | 348/207.99 |
| 2010/0141734 A1 * | 6/2010 | Tani et al. | ..................... | 348/36 |

FOREIGN PATENT DOCUMENTS

| | | | |
|---|---|---|---|
| JP | 8-46858 A | | 2/1996 |
| JP | 2000-341574 A | | 12/2000 |
| JP | 2003134375 A | * | 5/2003 |
| JP | 2005269573 A | * | 9/2005 |
| JP | 2006-48395 A | | 2/2006 |

OTHER PUBLICATIONS

Japanese Office Action for corresponding JP Application No. 2006-181200, dated Dec. 22, 2009, pp. 1-6 Japan.

* cited by examiner

*Primary Examiner*—Jason Chan
*Assistant Examiner*—Cynthia Calderon
(74) *Attorney, Agent, or Firm*—Ditthavong, Mori & Steiner, P.C.

(57) ABSTRACT

An image capturing system includes a first camera, a second camera and a first rotating device. The first camera is configured to capture a first image. The second camera is configured to capture a second image whose scope is narrower than a scope of the first image. The first rotating device connects the first camera and the second camera. The first rotating device is configured to rotate the first camera and the second camera around a first rotational axis which is on the first rotating device.

17 Claims, 9 Drawing Sheets

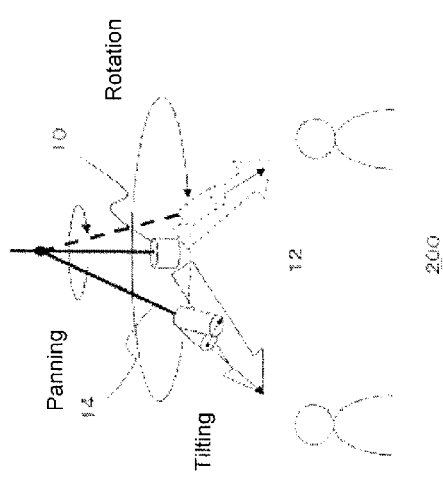
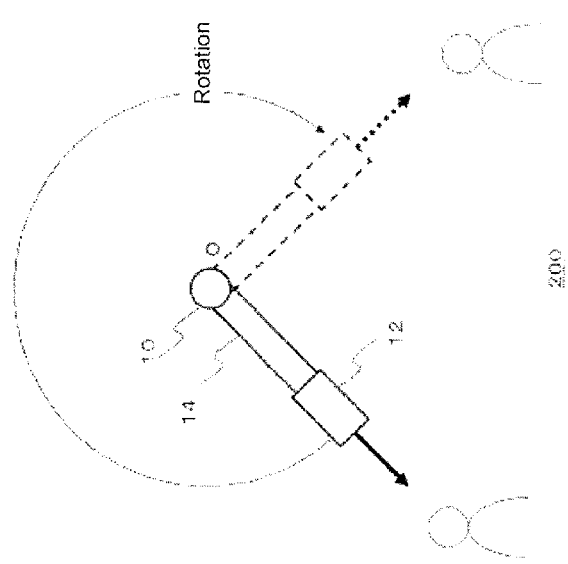
Fig. 4 (a)
Fig. 4 (b)

IMAGE CAPTURING SYSTEM EMPLOYING DIFFERENT ANGLE CAMERAS ON A COMMON ROTATION AXIS AND METHOD FOR SAME

CROSS-REFERENCE TO RELATED APPLICATIONS

The present application claims priority under 35 U.S.C. §119 to Japanese Patent Application No. 2006-052885, filed Feb. 28, 2006, entitled "IMAGE CAPTURING APPARATUS" and Japanese Patent Application No. 2006-181200, filed Jun. 30, 2006, entitled "IMAGE CAPTURING APPARATUS." The contents of these applications are incorporated herein by reference in their entirety.

BACKGROUND OF THE INVENTION

1. Field of the Invention

The present invention relates to an image capturing system and an image capturing method.

2. Discussion of the Background

Video conferences and monitoring cameras allow users to control cameras via networks such that the users can receive and view the captured images.

For example, Japanese Unexamined Patent Application Publication No. 2000-341574 discloses a camera control system including an image capturing device with a first camera for capturing wide-angle images and a second camera capable of controlling pans and tilts thereof and a display device connected to the image capturing device via a network and displaying the images sent from the first and second cameras. This system allows users to remotely control the second camera while comparing the images sent from the first camera with those sent from the second camera, and to change the range of images to be displayed in detail instantaneously according to, for example, changes in circumstances.

However, even when a specific object is detected in images captured by the first camera, for example, the second camera needs to be controlled separately to focus on the specific object since the positions and the directions of the first and second cameras are individually controlled and adjusted.

SUMMARY OF THE INVENTION

According to one aspect of the present invention, an image capturing system includes a first camera, a second camera and a first rotating device. The first camera is configured to capture a first image. The second camera is configured to capture a second image whose scope is narrower than a scope of the first image. The first rotating device connects the first camera and the second camera. The first rotating device is configured to rotate the first camera and the second camera around a first rotational axis which is on the first rotating device.

According to another aspect of the present invention, an image capturing method includes capturing a first image using a first camera, capturing a second image using a second camera, connecting the first camera and the second camera via a first rotating device, and rotating the first camera and the second camera around a first rotational axis which is on the first rotating device. A scope of the second image is narrower than a scope of the first image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4(a) and 4(b) are a perspective view and a top view, respectively, of an image capturing device 200 according to a second embodiment of the present invention;

DESCRIPTION OF THE EMBODIMENTS

Figure 1:
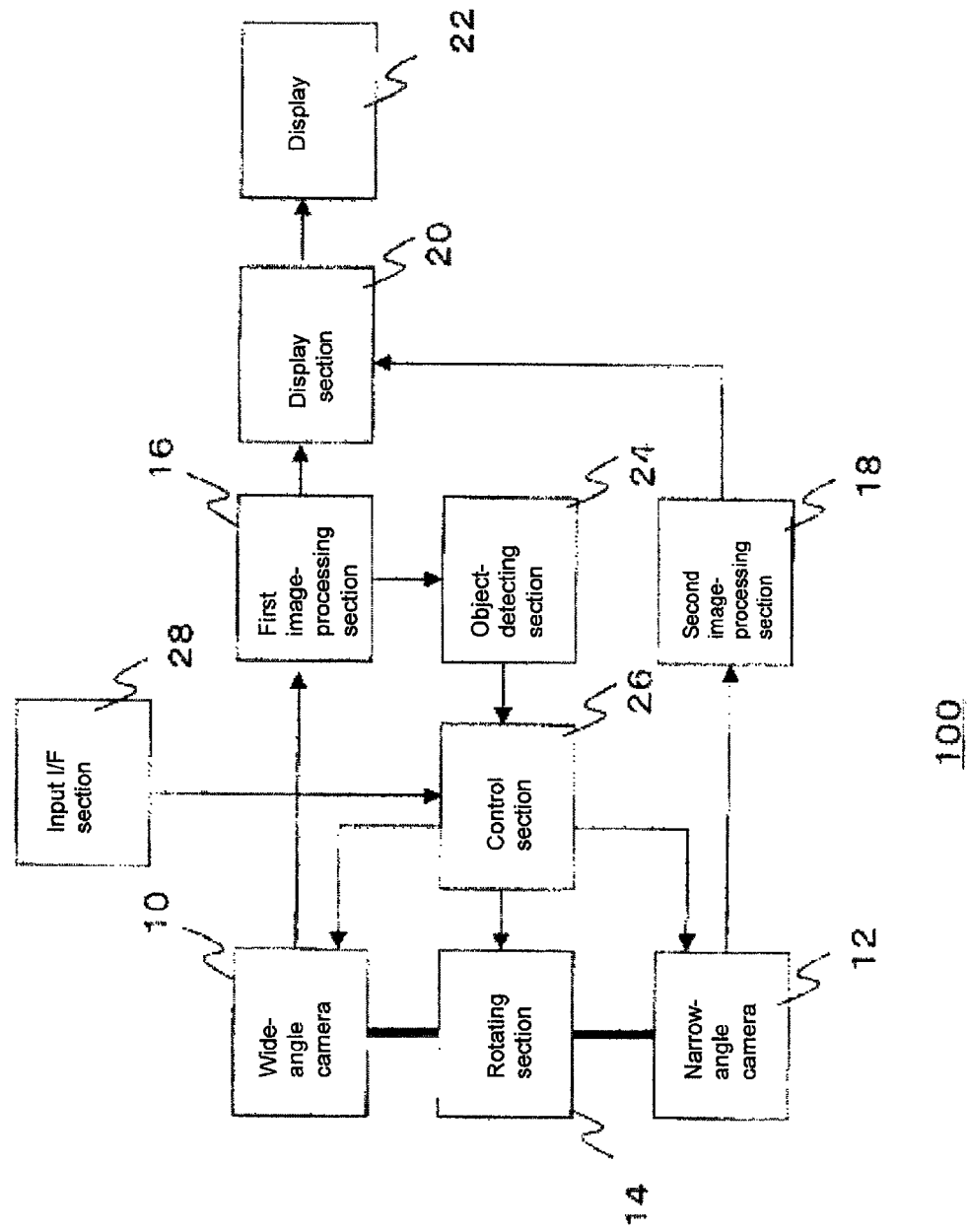
FIG. 1 illustrates a system configuration of an image capturing device 100 according to a first embodiment of the present invention.

The embodiments will now be described with reference to the accompanying drawings, wherein like reference numerals designate corresponding or identical elements throughout the various drawings.

FIG. 1 illustrates a system configuration of an image capturing device 100 according to a first embodiment of the present invention. This image capturing device 100 includes a wide-angle camera 10, a narrow-angle camera 12, a rotating section 14, a first image-processing section 16, a second image-processing section 18, a display section 20, a display 22, an object-detecting section 24, a control section 26, and an input I/F section 28.

In FIG. 1, the display 22 is included in the image capturing device 100. However, the display 22 can be provided outside the image capturing device 100. For example, the display 22 can be connected to the image capturing device 100 via a cable, a wired network, or a wireless network.

The wide-angle camera 10 includes a fisheye lens for capturing overall images in a wide range. Instead of the fisheye lens, the wide-angle camera 10 can include a wide-angle lens or an aspherical mirror such as a hyperboloidal mirror, a paraboloidal mirror, and a conical mirror for capturing overall images in a wide range.

The narrow-angle camera 12 includes a narrow-angle lens such as a telephoto lens for minutely capturing parts of the overall images captured by the wide-angle camera 10. The rotating section 14 supports the wide-angle camera 10 and the narrow-angle camera 12, and is controlled such that the cameras are rotated while maintaining a predetermined distance from each other by the control section 26 (described below).

Figure 2:
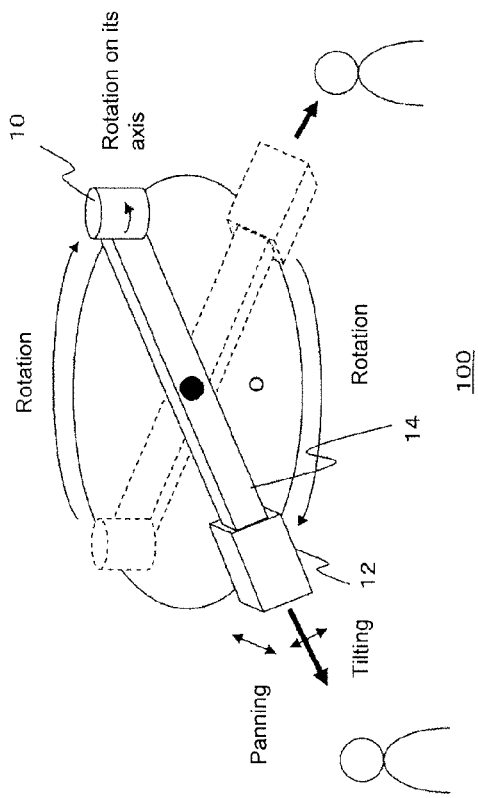
FIGS. 2(a) and 2(b) are a perspective view and a top view, respectively, of the image capturing device 100 according to the first embodiment.
Figure 2:
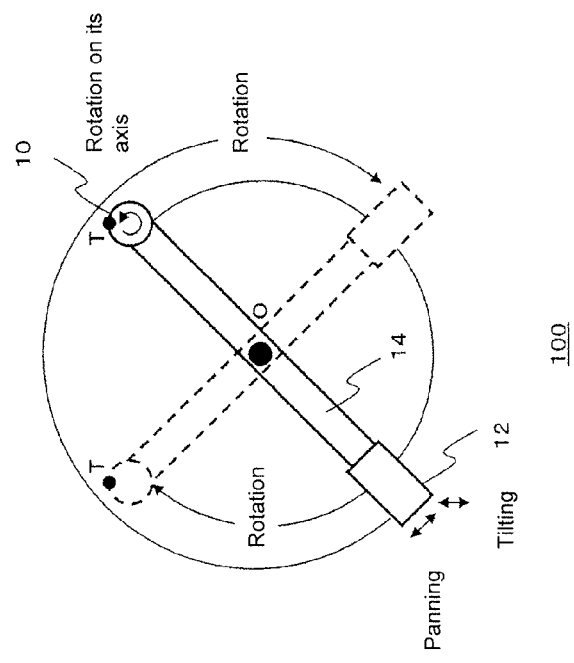

FIG. 2(a) is a perspective view illustrating the wide-angle camera 10 and the narrow-angle camera 12 attached to the rotating section 14 in the image capturing device 100, and FIG. 2(b) illustrates the components viewed from the top. The rotating section 14 includes gears at a rotational axis O thereof, and is rotated about this rotational axis O together with the wide-angle camera 10 and the narrow-angle camera 12.

Moreover, as shown in FIGS. 2(a) and 2(b), the wide-angle camera 10, the narrow-angle camera, 12 and the rotating section 14 are arranged such that a straight line connecting the wide-angle camera 10 and the narrow-angle camera 12 passes through the rotational axis O of the rotating section 14. That is, the wide-angle camera 10 and the narrow-angle camera 12 are always disposed opposite each other with respect to the rotational axis O.

Moreover, the wide-angle camera 10 also includes gears so as to rotate on its axis in synchronization with the rotation thereof about the rotational axis O. More specifically, when the wide-angle camera 10 is rotated about the rotational axis O in a direction A by an angle □, the gears are operated such that the wide-angle camera 10 rotates on its axis in a direction opposite to the direction A by the angle □. With this, a point T on the wide-angle camera 10 shown in FIG. 2(b) is always directed in the same direction with respect to the image capturing device 100. That is, the captured images are not rotated even when the wide-angle camera 10 is rotated about the rotational axis O. On the other hand, the narrow-angle camera 12 includes a biaxial movable mechanism allowing the narrow-angle camera 12 to move horizontally and vertically for panning and tilting.

With reference to FIG. 1, the first image-processing section 16 performs various image processing such as A/D conversion, color conversion, and color correction on the image signals output from the wide-angle camera 10. Similarly, the second image-processing section 18 performs various image processing such as A/D conversion, color conversion, and color correction on the image signals output from the narrow-angle camera 12.

The display section 20 synthesizes the image signals output from the first image-processing section 16 and the image signals output from the second image-processing section 18 or selects either of the image signals so as to generate image signals to be displayed on the display 22. The display 22 displays images on the basis of the image signals generated at the display section 20.

The object-detecting section 24 detects a specific object in the overall images captured by the wide-angle camera 10 on the basis of the image signals output from the first image-processing section 16. This specific object includes a person, a car, a license plate on a car, and the like, and is not limited to these.

A feature quantity of a specific object to be detected is prestored in the object-detecting section 24, and is compared with analyzed results of the image signals output from the first image-processing section 16. When the compared results are more than or equal to a predetermined threshold level, it is determined that a specific object exists in the overall images captured by the wide-angle camera 10.

Moreover, the object-detecting section 24 can determine an object moving in the overall images captured by the wide-angle camera 10 as a specific object. In this case, the object-detecting section 24 obtains differences between the image signals previously output from the first image-processing section 16 and the latest image signals output from the first image-processing section 16. When the differences in an area are more than or equal to a predetermined threshold level, it is determined that a specific object exists in this area.

When it is determined that a specific object exists in the overall images, the object-detecting section 24 outputs the positional information of the specific object in the images.

When the object-detecting section 24 detects a specific object in the overall images captured by the wide-angle camera 10, the control section 26 rotates the rotating section 14 such that the angle from the wide-angle camera 10 to the object corresponds to that from the narrow-angle camera 12 to the object using a below-mentioned method on the basis of the positional information of the specific object output from the object-detecting section 24. At the same time, the control section 26 controls the wide-angle camera 10 such that the wide-angle camera 10 rotates on its axis according to the rotational angle of the rotating section 14.

The input I/F section 28 receives instructions on panning and tilting of the narrow-angle camera 12 from users. The instructions input to the input I/F section 28 are sent to the control section 26, and the control section 26 controls panning and tilting of the narrow-angle camera 12. With this, users can focus the narrow-angle camera 12 on an area the users want to view in detail by issuing instructions to the input I/F section 28 for panning and tilting of the narrow-angle camera 12 while viewing the images captured by the wide-angle camera 10 and the narrow-angle camera 12 displayed on the display 22.

The operations of the image capturing device 100 having the above-described structure will now be described. The overall images captured by the wide-angle camera 10 are subjected to various image processing at the first image-processing section 16, and are displayed on the display 22 via the display section 20. Moreover, the image signals output from the first image-processing section 16 are also input to the object-detecting section 24.

The object-detecting section 24 analyzes the image signals output from the first image-processing section 16, compares the results with the preset feature quantity of a specific object, and then determines whether a specific object exists in the overall images captured by the wide-angle camera 10. Alternatively, the object-detecting section 24 determines whether a specific object exists in an area by determining differences between the image signals previously output from the first image-processing section 16 and the latest image signals output from the first image-processing section 16.

When it is determined that a specific object exists in the overall images, the object-detecting section 24 determines the positional information of the specific object in the overall images, and outputs the results to the control section 26. When the control section 26 receives the determination results that a specific object exists in the overall images captured by the wide-angle camera 10 from the object-detecting section 24, the control section 26 controls the rotation of the rotating section 14 such that the angle from the wide-angle camera 10 to the object corresponds to that from the narrow-angle camera 12 to the object.

Figure 3:
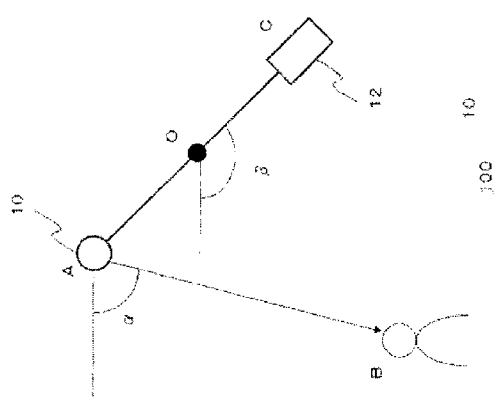
FIGS. 3(a) and 3(b) illustrate a method for controlling a rotating section 14 by a control section 26 shown in FIG. 1.
Figure 3:
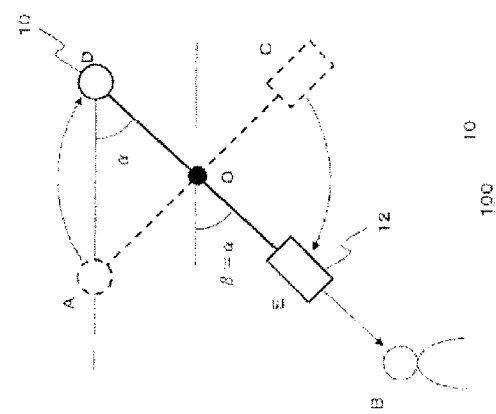

FIGS. 3(a) and 3(b) illustrate a method for controlling the rotating section 14 by the control section 26. The control section 26 calculates an angle α from the wide-angle camera 10 to the specific object on the basis of the positional information of the specific object output from the object-detecting section 24, and compares the angle α with a rotational angle β of the rotating section 14. When the angle α differs from the rotational angle β, the angle from the wide-angle camera 10 to the specific object does not correspond to that from the narrow-angle camera 12 to the specific object as shown in FIG. 3(a). Therefore, the control section 26 rotates the rotating section 14.

The control section 26 rotates the rotating section 14 while successively calculating the angle α from the wide-angle camera 10 to the specific object until the angle α corresponds to the rotational angle β of the rotating section 14. When the angle α from the wide-angle camera 10 to the specific object is matched to the rotational angle β of the rotating section 14, the rotation of the rotating section 14 is stopped. In addition to the wide-angle camera 10 provided for the rotating section 14, the narrow-angle camera 12 is rotated at the same time as shown in FIG. 3(b). Therefore, the angle from the wide-angle camera 10 to the object is matched to that from the narrow-angle camera 12 to the object when the angle α from the wide-angle camera 10 to the specific object corresponds to the rotational angle β of the rotating section 14.

Next, when the angle from the wide-angle camera 10 to the specific object corresponds to that from the narrow-angle camera 12 to the specific object, the images captured by the narrow-angle camera 12 and subjected to various image processing at the second image-processing section 18 are displayed on the display 22 via the display section 20 together with the overall images captured by the wide-angle camera 10. Users can focus the narrow-angle camera 12 on the area the users want to view in detail by issuing instructions to the input I/F section 28 for panning and tilting of the narrow-angle camera 12 while viewing the overall images captured by the wide-angle camera 10 and the images captured by the narrow-angle camera 12.

Moreover, when the specific object taken in the overall images captured by the wide-angle camera 10 moves, the control section 26 controls the rotation of the rotating section 14 again until the angle from the wide-angle camera 10 to the object corresponds to that from the narrow-angle camera 12 to the object on the basis of the determination results of the object-detecting section 24.

According to the image capturing device 100 in accordance with the first embodiment of the present invention, the wide-angle camera 10 and the narrow-angle camera 12 are attached to the rotating section 14, and the rotating section 14 is rotated such that the wide-angle camera 10 and the narrow-angle camera 12 are rotated about the rotational axis O while the wide-angle camera 10 and the narrow-angle camera 12 always maintain a certain distance therebetween. Accordingly, the rotation of the rotating section 14 on the basis of the positional information of a specific object in the overall images captured by the wide-angle camera 10 can move the narrow-angle camera 12 to a position on an extension connecting the specific object and the rotational axis O when the wide-angle camera 10 is moved to a position on the extension. Therefore, even when the specific object moves, the object can be easily tracked by the narrow-angle camera 12 without separately controlling the wide-angle camera 10 and the narrow-angle camera 12.

Moreover, since the wide-angle camera 10 rotates on its axis according to the rotational angle of the rotating section 14, the images captured by the wide-angle camera 10 are always fixed in the same direction even when the rotating section 14 is rotated. Therefore, no rotation processing of the captured images is required at the first image-processing section 16, resulting in a reduction in workload for image processing.

FIG. 4(a) is a perspective view of an image capturing device 200 according to a second embodiment of the present invention, and FIG. 4(b) is a top view of the image capturing device 200. The system configuration of the image capturing device 200 according to the second embodiment of the present invention corresponds to that of the image capturing device 100 according to the first embodiment.

In the image capturing device 200 according to the second embodiment of the present invention, the wide-angle camera 10 is fixed to the rotational axis O. Therefore, the angle from the wide-angle camera 10 to a specific object does not change while the control section 26 rotates the rotating section 14 such that the angle from the wide-angle camera 10 to the specific object corresponds to that from the narrow-angle camera 12 to the specific object since the wide-angle camera 12 is fixed to the rotational axis O. With this, unlike the image capturing device 100 according to the first embodiment, the control section 26 does not need to successively calculate the angle α from the wide-angle camera 10 to the specific object while rotating the rotating section 14, and can match the angle from the wide-angle camera 10 to the specific object to that from the narrow-angle camera 12 to the specific object by calculating the angle α from the wide-angle camera 10 to the specific object only once and by rotating the rotating section 14 by the angle α.

Moreover, since the wide-angle camera 10 is fixed to the rotational axis O of the rotating section 14, the narrow-angle camera 12 can be easily panned by rotating the rotating section 14. That is, the image capturing device 100 according to the first embodiment has a problem that the field angle of the overall images captured by the wide-angle camera 10 is slightly changed when the rotating section 14 is rotated for panning of the narrow-angle camera 12 since the wide-angle camera 10 is also moved at the same time during the rotation of the rotating section 14, and image processing is required for correcting this. In contrast, in the image capturing device 200 according to the second embodiment, the wide-angle camera 10 is fixed to the rotational axis O of the rotating section 14 so as not to be moved, and the captured images are not rotated even when the rotating section 14 is rotated. Therefore, the rotation of the rotating section 14 for panning of the narrow-angle camera 12 does not influence image capturing by the wide-angle camera 10. When the panning of the narrow-angle camera 12 is realized by the rotation of the rotating section 14, the narrow-angle camera 12 requires only a uniaxial movable mechanism for tilting. With this, the biaxial movable mechanism can be omitted, resulting in a more simplified image capturing device. In addition, the tilting range can be increased.

In the image capturing device 200 in accordance with the second embodiment, in addition to the effects accomplished by the first embodiment, the angle from the wide-angle camera 10 to the specific object can be matched to that from the narrow-angle camera 12 to the specific object more easily since the angle from the wide-angle camera 10 to the specific object is constant even when the rotating section 14 is rotated due to the wide-angle camera 10 fixed to the rotational axis O. Moreover, a more simplified and smaller image capturing device can be realized since panning of the narrow-angle camera 12 can be realized by the rotation of the rotating section 14.

Figure 5:
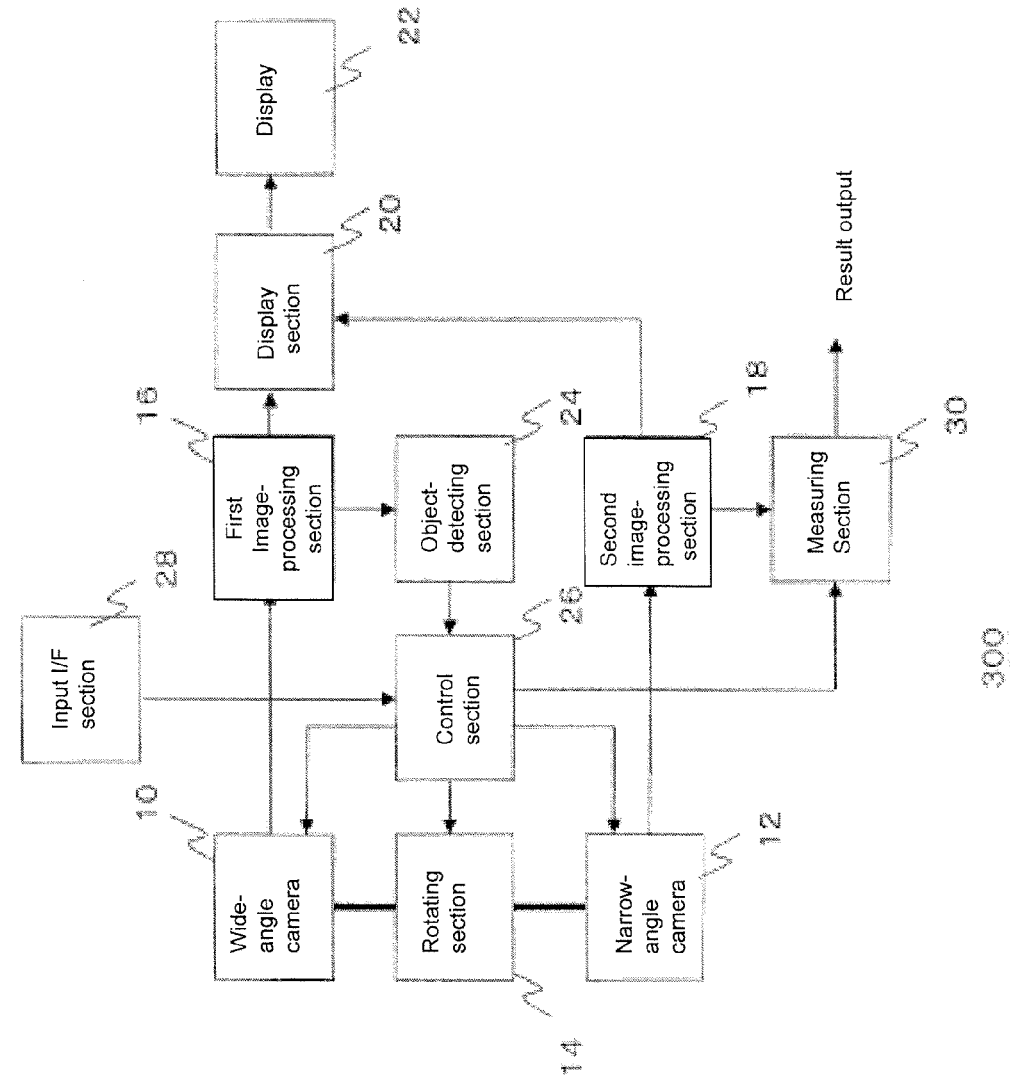
FIG. 5 illustrates a system configuration of an image capturing device 300 according to a third embodiment of the present invention.

FIG. 5 illustrates a system configuration of an image capturing device 300 according to a third embodiment of the present invention. The structure of the image capturing device 300 according to the third embodiment differs from that of the image capturing device 100 according to the first embodiment in that the image capturing device 300 includes a measuring section 30. Structures other than this are the same as those in the first embodiment, and the descriptions thereof will be omitted.

The measuring section 30 is connected to the second image-processing section 18 and the control section 26 so as to measure the distance from the image capturing device 300 to the specific object detected by the object-detecting section 24 using the images captured by the narrow-angle camera 12.

Figure 6:
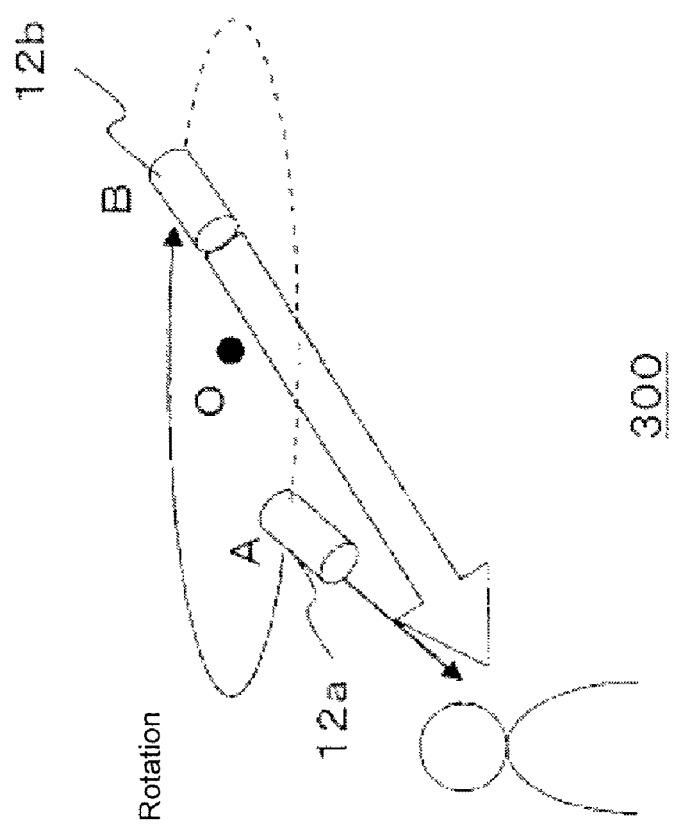
FIG. 6 illustrates a measuring method in the image capturing device 300 shown in FIG. 5.

The operations of the image capturing device 300 will now be described. FIG. 6 illustrates a measuring method in the image capturing device 300. When the object-detecting section 24 detects a specific object, the image capturing device 300 rotates the rotating section 14 using the control section 26 such that the angle from the wide-angle camera 10 to the specific object corresponds to that from the narrow-angle camera 12 to the specific object.

When the angle from the wide-angle camera 10 to the specific object is matched to that from the narrow-angle camera 12 to the specific object, the narrow-angle camera 12 is stopped at a position A shown in FIG. 6, and captures images of the specific object. These images are subjected to various image processing at the second image-processing section 18, and then displayed on the display 22 via the display section 20. At the same time, the image signals output from the second image-processing section 18 are also sent to the measuring section 30. The measuring section 30 calculates the capturing angle of the narrow-angle camera 12a located at the position A shown in FIG. 6 to the specific object in the top-to-bottom direction on the basis of the image signals output from the second image-processing section 18.

Next, the control section 26 rotates the rotating section 14 by 180° such that the narrow-angle camera 12 is moved to a position B, which is symmetrical to the position A shown in FIG. 6 with respect to the rotational axis O. The narrow-angle camera 12 captures images of the specific object at the position B. The images are subjected to various image processing, and then displayed on the display 22 via the display section 20. At the same time, the image signals output from the second image-processing section 18 are also sent to the measuring section 30.

The measuring section 30 determines that the narrow-angle camera 12 is moved to the position B using the signals from the control section 26, and calculates the capturing angle of the narrow-angle camera 12b located at the position B shown in FIG. 6 to the specific object on the basis of the image signals output from the second image-processing section 18.

The measuring section 30 calculates the distance from the image capturing device 300 to the specific object using the capturing angle of the narrow-angle camera 12 located at the position A to the specific object, the capturing angle of the narrow-angle camera 12 located at the position B to the specific object, and the diameter of rotation of the narrow-angle camera 12. The result is then output to the exterior so as to control various devices.

In this embodiment, angles from the narrow-angle camera 12 to the specific object are determined at two positions. However, the present invention is not limited to this, and angles can be determined at two or more positions.

Figure 7:
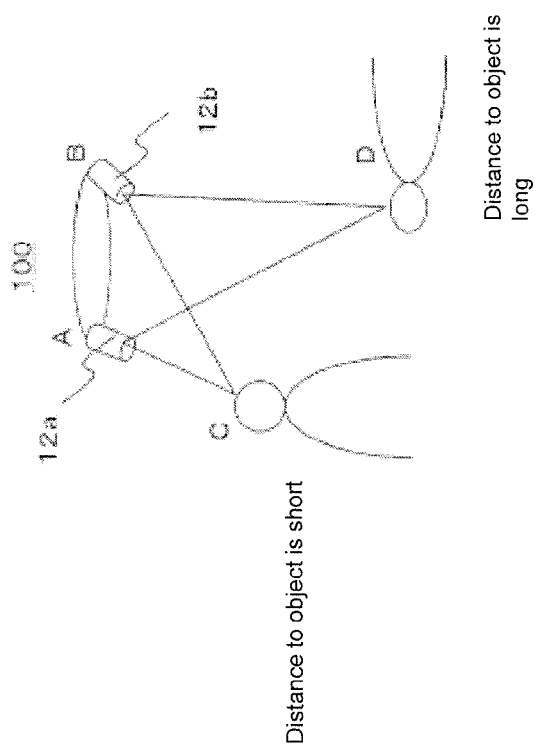
FIGS. 7(a) and 7(b) illustrate a method for controlling a lighting system using the image capturing device 300 shown in FIG. 5.

FIGS. 7(a) and 7(b) illustrate an application of the image capturing device 300, the image capturing device 300 being installed on the ceiling so as to determine the attitudes of human bodies and switch a lighting system on or off according to the results of the object detection. FIG. 7(a) illustrates the results output from the measuring section when a person is standing up and when a person is lying down. When a person is standing up, the distance from the image capturing device 300 to the specific object (human body) calculated by the measuring section 30 is short. On the other hand, when a person is lying down, the distance from the image capturing device 300 to the specific object (human body) calculated by the measuring section 30 is long. The measuring section 30 determines that the person is standing up when the distance from the image capturing device 300 to the specific object (human body) is smaller than or equal to a predetermined threshold level, or determines that the person is lying down when the distance is larger than the predetermined threshold level. The result is then output to the lighting system.

FIG. 7(b) illustrates an exemplary criterion for switching the lighting system on or off on the basis of the results output from the measuring section 30 and the object-detecting section 24. The lighting system is switched off while no object is detected by the object-detecting section 24 regardless of the results output from the measuring section 30. On the other hand, when a still or moving object is detected by the object-detecting section 24 and the measuring section 30 determines that a person is standing up, the lighting system is switched on. Moreover, when the measuring section 30 determines that a person is lying down, the lighting system is switched off.

According to the image capturing device 300 in accordance with the third embodiment of the present invention, images of a specific object are captured by the narrow-angle camera 12 rotated by the rotating section 14 from at least two positions. On the basis of the capturing angles of the narrow-angle camera 12 at these positions and the diameter of rotation of the narrow-angle camera 12, the distance from the image capturing device 300 to the specific object can be easily measured.

The image capturing device 300 according to the third embodiment includes the measuring section 30 in addition to the structures of the image capturing device 100 according to the first embodiment. However, the image capturing device 200 according to the second embodiment including the measuring section 30 can also produce the same effect as in the third embodiment.

Figure 8:
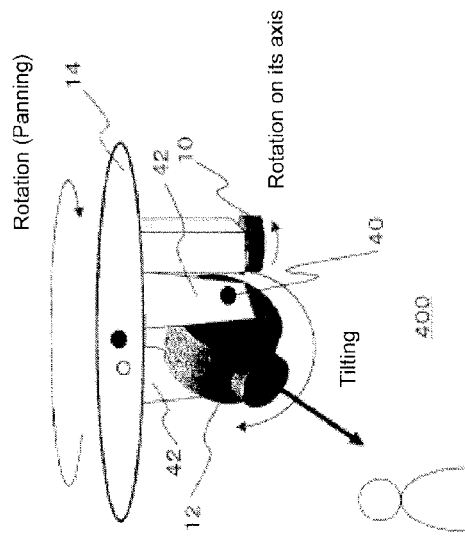
FIGS. 8(a) and 8(b) are a perspective view and a top view, respectively, of an image capturing device 400 according to a fourth embodiment of the present invention.
Figure 8:
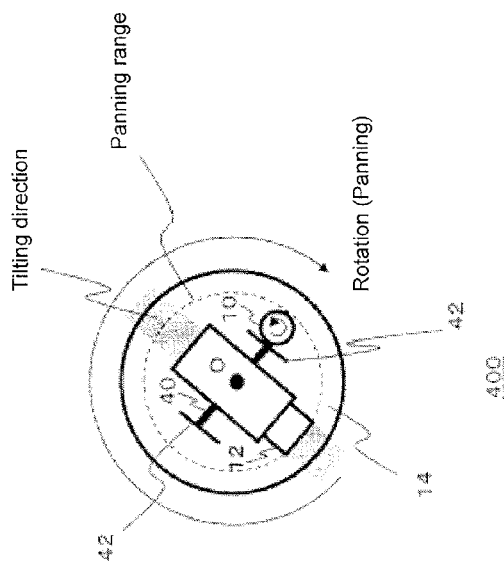

FIG. 8(a) is a perspective view of an image capturing device 400 according to a fourth embodiment of the present invention, and FIG. 8(b) is a top view of the image capturing device 400. The system configuration of the image capturing device 400 corresponds to that of the image capturing device 100 according to the first embodiment shown in FIG. 1 except for the arrangement of the wide-angle camera 10 and the narrow-angle camera 12. Only differences from the first embodiment will be described.

The narrow-angle camera 12 in the image capturing device 400 is disposed on the rotational axis O of the rotating section 14, and fixed to the rotating section 14 such that the capturing direction of the narrow-angle camera 12 is rotated according to the rotation of the rotating section 14.

Moreover, a uniaxial rotational mechanism 40 is provided for the narrow-angle camera 12, and the axis of the uniaxial rotational mechanism 40 is supported by struts 42 that are fixed to the rotating section 14. The rotation of the uniaxial rotational mechanism 40 allows the narrow-angle camera 12 to tilt. The rotation of the rotating section 14 allows the narrow-angle camera 12 to pan.

The wide-angle camera 10 is fixed to the rotating section 14 so as not to be disposed at a position in the tilting direction of the narrow-angle camera 12 as shown in FIG. 8(b), and is rotated according to the rotation of the rotating section 14. Moreover, as in the first embodiment, the wide-angle camera 10 rotates on its axis in synchronization with the rotation of the wide-angle camera 10 about the rotational axis O.

Figure 9:
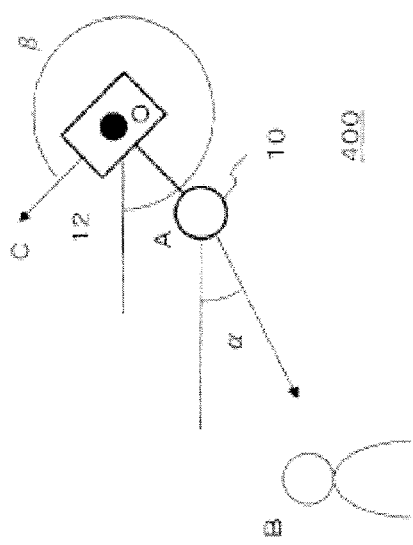
FIGS. 9(a) and 9(b) illustrate a method for controlling the rotating section 14 by the control section 26 of the image capturing device 400 according to the fourth embodiment of the present invention.
Figure 9:
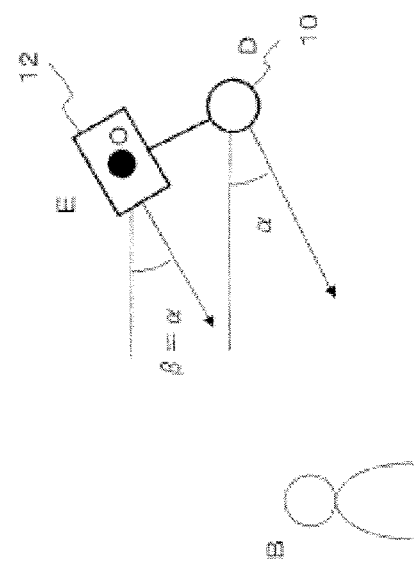

FIGS. 9(a) and 9(b) illustrate a method for controlling the rotating section 14 by the control section 26 shown in FIG. 1. The control section 26 calculates the angle $\alpha$ from the wide-angle camera 10 to the specific object on the basis of the positional information of the specific object output from the object-detecting section 24 shown in FIG. 1, and compares the angle $\alpha$ with the rotational angle $\alpha$ of the rotating section 14. When the angle $\alpha$ differs from the angle $\beta$, the angle from the wide-angle camera 10 to the specific object does not correspond to that from the narrow-angle camera 12 to the specific object as shown in FIG. 9(a). Therefore, the control section 26 rotates the rotating section 14.

The control section 26 rotates the rotating section 14 while successively calculating the angle α from the wide-angle camera 10 to the specific object until the angle α corresponds to the rotational angle α of the rotating section 14. When the angle α from the wide-angle camera 10 to the specific object is matched to the rotational angle β of the rotating section 14, the rotation of the rotating section 14 is stopped. In addition to the wide-angle camera 10 provided for the rotating section 14, the capturing direction of the narrow-angle camera 12 is rotated as shown in FIG. 9(b). Therefore, the angle from the wide-angle camera 10 to the object is matched to that from the narrow-angle camera 12 to the object when the angle α from the wide-angle camera 10 to the specific object corresponds to the rotational angle β of the rotating section 14.

Other operations of the image capturing device 400 are the same as those of the image capturing device 100 according to the first embodiment, and the descriptions thereof will be omitted. However, panning of the image capturing device 400 is performed by the rotation of the rotating section 14.

According to the image capturing device 400 in accordance with the fourth embodiment of the present invention, the wide-angle camera 10 and the narrow-angle camera 12 are attached to the rotating section 14. The narrow-angle camera 12 is disposed on the rotational axis O of the rotating section 14, and at the same time, fixed to the rotating section 14 such that the capturing direction of the narrow-angle camera 12 is rotated according to the rotation of the rotating section 14. With this, the following effects can be produced.

(1) The capturing direction of the narrow-angle camera 12 can be easily oriented to the specific object by the rotation of the rotating section 14 on the basis of the positional information of a specific object in the overall images captured by the wide-angle camera 10. Therefore, even when the specific object moves, the object can be easily tracked by the narrow-angle camera 12 without separately controlling the wide-angle camera 10 and the narrow-angle camera 12.

(2) Since the narrow-angle camera 12 for tilting is disposed on the rotational axis O, the amount of spaces required for the narrow-angle camera 12 to pan can be reduced as compared with the case in which the narrow-angle camera 12 is rotated in the vicinity of the rotational axis O. This leads to a size reduction of the image capturing device 400.

(3) Since the narrow-angle camera 12 can pan by the rotation of the rotating section 14, the narrow-angle camera 12 requires only a uniaxial movable mechanism for tilting. With this, the biaxial movable mechanism can be omitted, resulting in a more simplified image capturing device. In addition, the tilting range can be increased.

(4) The wide-angle camera 10 is attached to the rotating section 14 so as not to be disposed at a position in the tilting direction of the narrow-angle camera 12. Thus, the tilting range of the narrow-angle camera 12 can be increased even when the wide-angle camera 10 and the narrow-angle camera 12 are disposed close to each other. Therefore, the wide-angle camera 10 can be disposed in a space required for the narrow-angle camera 12 to pan. In this case, the size of the image capturing device 400 is determined by only the size of the space required for the narrow-angle camera 12 to tilt and pan, and a small image capturing device 400 can be realized.

(5) Since the wide-angle camera 10 rotates on its axis according to the rotational angle of the rotating section 14, the images captured by the wide-angle camera 10 are always fixed in the same direction even when the rotating section 14 is rotated. Therefore, no rotation processing of the captured images is required at the first image-processing section 16, resulting in a reduction in workload for image processing.

The present invention has been described above by presenting embodiments, but the embodiments are intended as examples only. It will be understood by those skilled in the art that various modifications to combinations of the components and the processes in the embodiments are permissible and such modifications are embraced within the scope of the invention.

Moreover, in the above-described embodiments, a specific object is detected from the overall images captured by the wide-angle camera 10, and the specific object is traced by the narrow-angle camera 12. Aside from this, the narrow-angle camera 12 can be periodically moved so as to change the capturing direction thereof for capturing a plurality of sites, and the mode for tracing the specific object and the mode for periodically capturing the plurality of sites can be switched. With this, the amount of uncaptured spaces can be reduced as compared with the mode for capturing only one site or one object.

Moreover, in the above-described embodiments, the overall images captured by the wide-angle camera 10 are displayed on the display 22. However, only the images of a specific object captured by the narrow-angle camera 12 can be displayed on the display 22, and the system can be configured such that users can issue instructions for panning and tilting with reference to only the images captured by the narrow-angle camera 12. In this case, the wide-angle camera 10 can be used as a sensor for detecting a specific object. Moreover, the users can determine whether the overall images captured by the wide-angle camera 10 are displayed on the display 22 or not.

Moreover, the narrow-angle camera 12 includes a biaxial movable mechanism for panning and tilting in the first embodiment. When the rotating section 14 can be accurately controlled by the control section 26, the narrow-angle camera 12 can be mostly directed to the specific object in the horizontal direction. In this case, the narrow-angle camera 12 requires only a uniaxial movable mechanism moving vertically for tilting, resulting in a more simplified image capturing device 100. In addition, the tilting range of the narrow-angle camera 12 can be increased.

Moreover, the wide-angle camera 10 and the narrow-angle camera 12 are always disposed opposite each other with respect to the rotational axis O in the first embodiment, but the invention is not limited to this. The rotational axis O of the rotating section 14 can be located at any position on a straight line connecting the wide-angle camera 10 and the narrow-angle camera 12, and can be outside the range between the wide-angle camera 10 and the narrow-angle camera 12.

Moreover, the distance between the image capturing device 300 and a specific object is measured using the measuring section 30 in the third embodiment. However, the results of the measuring section 30 can be sent to the object-detecting section 24 such that the object-detecting section 24 estimates the moving distance of the object on the basis of the results of the measuring section 30. For example, it is estimated that the moving distance of the object can be large when the distance to the object is small, and the moving distance of the object can be small when the distance to the object is large. Thus, the object-detecting section 24 can accurately trace the object by estimating the moving distance of the object on the basis of the results of the measuring section 30.

Moreover, the distance to an object is measured by moving the narrow-angle camera 12 to different positions for capturing the object a plurality of times in the third embodiment. However, the same effect can be accomplished by moving the wide-angle camera 10 to different positions for capturing a specific object a plurality of times and then measuring the distance to the object.

Moreover, the measuring section 30 according to the third embodiment can be added to the image capturing device 400 according to the fourth embodiment. In this case, the distance to an object can be measured by moving the wide-angle camera 10 instead of the narrow-angle camera 12.

Moreover, in the first and fourth embodiments, since the wide-angle camera 10 rotates on its axis according to the rotational angle of the rotating section 14, the images captured by the wide-angle camera 10 are always fixed in the same direction even when the rotating section 14 is rotated. However, images always oriented in the same direction can be captured by performing image processing on the images captured by the wide-angle camera 10 at the first image-processing section 16 according to the rotational angle of the rotating section 14. In this case, no gears are required for the wide-angle camera 10 to rotate on its axis, resulting in a smaller image capturing device.

Moreover, in the image capturing device according to the fourth embodiment, and at the same time, capable of capturing images always oriented in the same direction by performing image processing at the first image-processing section 16 according to the rotational angle of the rotating section 14, when the field angle of the wide-angle camera 10 in the horizontal direction differs from that in the vertical direction, the narrow-angle camera 12 can be disposed at a position in the direction of a smaller field angle of the wide-angle camera 10. With this, the narrow-angle camera 12 is not captured by the wide-angle camera 10 even when the wide-angle camera 10 and the narrow-angle camera 12 are disposed close to each other, resulting in a smaller image capturing device.

It should be understood that the embodiments disclosed herein are in all respects illustrative, not restrictive. The scope of the present invention shall be given not by the description of the foregoing embodiments but by the scope of the accompanying claims, and all modifications made within the meanings and scope of equivalency of the claims shall be included therein.

What is claimed as new and is desired to be secured by Letters Patent of the United States is:

1. An image capturing system comprising:
    a first camera configured to capture a first image in a first direction;
    a second camera configured to capture a second image whose scope is narrower than a scope of the first image; and
    a first rotating device which connects the first camera and the second camera and which is configured to rotate the first camera and the second camera around a first rotational axis which is on the first rotating device; wherein the first direction is fixed while the first rotating device rotates the first camera and the second camera.

2. The image capturing system according to claim 1, further comprising:
    a second rotating device configured to rotate the first camera around a second rotational axis according to a first rotational angle of the first rotating device around the first rotational axis, the second rotational axis being substantially in parallel with the first rotational axis and being in the first camera.

3. The image capturing system according to claim 2, wherein the second rotating device is configured to rotate the first camera by a second rotational angle substantially equal to the first rotational angle of the first rotating device in a second rotational direction opposite to a first rotational direction of the first rotating device.

4. The image capturing system according to claim 1, further comprising:
    a moving device configured to move the second camera in biaxial directions for panning and tilting.

5. The image capturing system according to claim 1, wherein the first rotating device is configured to rotate the first camera and the second camera around the first rotational axis so that an angle from the first camera to a target object becomes equal to an angle from the second camera to the target object.

6. The image capturing system according to claim 1, wherein the first camera is fixed to the first rotational axis.

7. The image capturing system according to claim 6, wherein the first rotating device is configured to rotate the second camera around the first rotational axis for panning.

8. The image capturing system according to claim 6, further comprising:
    a moving device configured to move the second camera in a uniaxial direction for tilting.

9. The image capturing system according to claim 6, wherein an optical axis of the first camera is substantially coaxial with the first rotational axis.

10. The image capturing system according to claim 1, wherein the first rotational axis, an optical axis of the first camera and a third rotational axis around which the second camera is configured to be panned are on a same line.

11. The image capturing system according to claim 1, further comprising:
    a distance measuring device configured to measure a distance from the image capturing system to a target object based on a first angle from the second camera in a first position to the target object, a second angle from the second camera in a second position to the target object and a rotational diameter of the second camera around the first rotational axis.

12. The image capturing system according to claim 1, wherein the second camera is provided on the first rotational axis.

13. The image capturing system according to claim 12, wherein the first rotating device is configured to rotate the second camera around the first rotational axis for panning.

14. The image capturing system according to claim 12, further comprising:
    a moving device configured to move the second camera in a tilting direction for tilting, the first camera being positioned outside the tilting direction.

15. The image capturing system according to claim 1, wherein the first rotational axis locates between the first camera and the second camera.

16. An image capturing system comprising:
    first image capturing means for capturing a first image in a first direction;
    second image capturing means for capturing a second image whose scope is narrower than a scope of the first image; and
    first rotating means for rotating the first image capturing means and the second image capturing means around a first rotational axis which is on the first rotating device, the first rotating means connecting the first image capturing means and the second image capturing means; wherein the first direction is fixed while the first rotating means rotates the first image capturing means and the second image capturing means.

17. An image capturing method comprising:
capturing a first image using a first camera in a first direction;
capturing a second image using a second camera, a scope of the second image being narrower than a scope of the first image;
connecting the first camera and the second camera via a first rotating device; and
rotating the first camera and the second camera around a first rotational axis which is on the first rotating device;
wherein the first direction is fixed while the first rotating device rotates the first camera and the second camera.

\* \* \* \* \*